United States Patent [19]

Andrews

[11] Patent Number: 4,793,338
[45] Date of Patent: Dec. 27, 1988

[54] ANTI-SIPHONING LIQUID VALVE FILTER

[76] Inventor: Terence J. Andrews, 36 Simeon La., Sterling, Va. 22170

[21] Appl. No.: 62,631

[22] Filed: Jun. 16, 1987

[51] Int. Cl.$^4$ .............................................. A62B 23/00
[52] U.S. Cl. .................................. 128/200.11; 55/355; 261/22
[58] Field of Search ...................... 128/200.11; 55/355; 261/22, DIG. 9

[56] References Cited

U.S. PATENT DOCUMENTS

| | | |
|---|---|---|
| 968,926 | 8/1910 | Fischer . |
| 988,398 | 4/1911 | Stein . |
| 2,251,795 | 8/1941 | Howard . |
| 3,378,241 | 4/1968 | Stokes . |
| 3,504,481 | 4/1970 | Zakarian ............... 261/DIG. 9 |
| 3,522,018 | 7/1970 | Bachmann et al. . |
| 3,525,309 | 8/1970 | Katz ..................... 261/DIG. 9 |
| 3,945,918 | 3/1976 | Kirk . |
| 3,998,613 | 12/1976 | Attig . |
| 4,140,735 | 2/1979 | Schumacher . |
| 4,476,092 | 10/1984 | Nakamura et al. . |
| 4,566,450 | 1/1986 | Brossman ............. 128/200.11 |

FOREIGN PATENT DOCUMENTS

| | | |
|---|---|---|
| 865777 | 2/1953 | Fed. Rep. of Germany ........... 128/200.11 |
| 959619 | 3/1957 | Fed. Rep. of Germany ........... 128/200.11 |
| 5807 | of 1901 | United Kingdom ........ 128/200.11 |
| 307823 | 6/1929 | United Kingdom . |

*Primary Examiner*—Alan Cohan
*Attorney, Agent, or Firm*—Birch, Stewart, Kolasch & Birch

[57] ABSTRACT

A method and apparatus for filtering a gas through a liquid which prevents siphoning of the liquid out of the filter apparatus including at least first and second vessels partially filled with liquid, the first vessel having gas inlet and outlet ports that do not contact the liquid, thereby enabling the gas to bypass the liquid of the first vessel in a normal filtering direction and prevent siphoning of the liquid therefrom, and a device to direct gas received from the second vessel into the liquid of the first vessel during a reverse gas flow such that the liquid in the first vessel acts as a valve. The second vessel includes gas inlet and outlet ports that do not contact the liquid, thereby enabling the gas to bypass the liquid of the second vessel in a reverse gas flow direction and prevent siphoning of the liquid therefrom, and a device to direct gas bypassed through the first vessel through the liquid such that liquid filters the gas which then exits the second vessel through a gas port. Normally, gas is bypassed through the first vessel and filtered through the liquid of the second vessel to pass through an outlet gas port of the second vessel. Gas is then permitted to bypass through the second vessel in a reverse gas flow direction and through the liquid valve of the first vessel to be discharged through a gas port. Gas flowing in either direction cannot cause the liquids in either vessel to be lost due to siphoning. The functions of the first and second vessels are reversible.

11 Claims, 2 Drawing Sheets

ANTI-SIPHONING LIQUID VALVE FILTER

BACKGROUND OF THE INVENTION

1. Field of the Invention

The present invention relates to a method and apparatus for filtering unwanted substances from a gas, and more particularly, to the filtering of gas through a liquid such that unwanted siphoning of the liquid out of the filter cannot occur.

2. Description of Background Art

Traditionally, the filtering of gas through a liquid required either the use of a mechanical valve or a special inlet port designed to prevent the loss of the filtering liquid by siphoning due to a reversal of gas flow. All previous inlet port designs actually enter the filtering liquid thus failing to prevent a possible loss of filtering liquid due to siphoning of the liquid. A primary feature of the present invention is that the gas inlet port does not enter the filtering liquid and is therefore an anti-siphoning apparatus.

3. Summary and Objects of the Invention

Accordingly, it is a primary object of the present invention to provide an apparatus that uses a liquid to filter a gas to remove unwanted substances from the gas.

It is another object of the present invention to provide the filter device with at least two vessels containing liquid, each of the two vessels having two identical ports either of which may be used as an inlet port or an outlet port. Gas to be filtered may move from one port to the other through the filtering liquid such that the liquid will not be siphoned out of either port.

It is another object of the present invention to prevent the liquid barrier from being broken due to an application of either pressure or vacuum at either inlet or outlet port.

It is still another object of the present invention to provide a filter that uses a liquid to filter gas to remove unwanted substances from the gas without requiring mechanical valves, such that the liquid in the two vessels act as valves.

It is an even further object of the present invention to provide a filter wherein the flow of gas can be bi-directional, but only if the inlet port becomes the outlet port.

The objects of the present invention are fulfilled by providing an anti-siphoning liquid valve filter for filtering a gas, the filter comprising a first vessel partially filled with liquid, the first vessel including bypass means for enabling the gas to bypass the liquid in the vessel in a normal filtering direction and for preventing siphoning of the liquid from the filter vessel, means for directing the gas into the liquid in the first vessel in a second direction, and means for discharging gas from the first vessel. Further, a second vessel is partially filled with liquid, the second vessel including means for filtering the gas bypassed through the first vessel in a normal filtering direction by directing the gas into the liquid of the second vessel, means for discharging filtered gas from the second vessel in a normal filtering direction, and a bypass for enabling the gas to bypass the liquid in the second vessel and prevent siphoning of the liquid from the second vessel. Gas is forced through the first and second vessels, respectively, in a normal filtering direction, and gas is permitted to flow through the second and first vessels, respectively, in a second direction to prevent the siphoning of liquid from either of said first and second vessels.

The anti-siphoning liquid valve filter may further include an intermediary vessel partially filled with liquid and have additional means for filtering the gas in the first filtering direction only by directing the gas into the liquid of the intermediary vessel.

Uses of the anti-siphoning filter of the present invention include, but are not limited to, a gas mask, an exhaust gas scrubber, and a double-exhaust gas scrubber.

A method for the filtering of gas for a gas mask through a liquid includes the steps of:

(a) inhaling atmospheric gas at the gas mask by the user, (b) bypassing the gas over a liquid partially filling a first vessel upon inhaling, (c) directing inhaled bypassed gas through liquid partially filling a second vessel, whereby the filtered gas enters the gas mask for inhalation by the user, (d) exhaling gas at the gas mask by the user, (e) bypassing the gas over the liquid partially filling the second vessel upon exhaling, and (f) filtering exhaled bypassed gas through the liquid partially filling the first vessel, whereby the filtered gas exits the first vessel to the atmosphere.

A method for filtering an exhaust gas from a reaction container comprises the steps of:

(a) exhausting contaminated gas from the reaction container, (b) bypassing the gas over a liquid partially filling a first vessel, (c) filtering the bypassed gas through liquid partially filling a second vessel, (d) exhausting filtered gas from the second vessel, (e) filtering the filtered gas exhausted from the second vessel through liquid partially filling a third vessel, and (f) exhausting filtered gas from the third vessel to the atmosphere.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
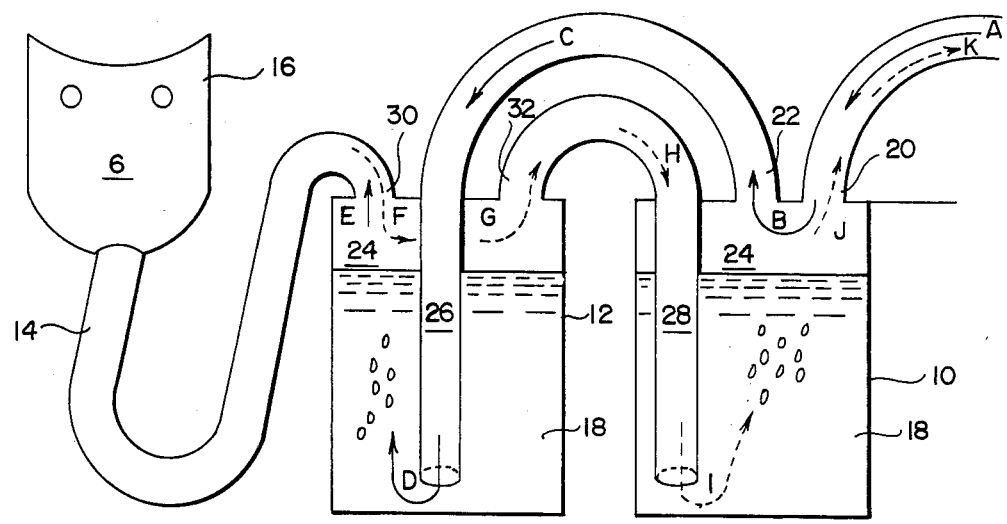
FIG. 1 is a cross-sectional view of an apparatus for the anti-siphoning liquid valve filter as used in a gas mask filter.

FIG. 1 is a cross-sectional view of the anti-siphoning liquid valve filter for use with a gas mask according to the following description.

A first vessel 10 is partially filled with liquid 18, and a second vessel 12 is also partially filled with a similar liquid 18. When a user inhales at the gas mask 16, outside air enters the first vessel at an inlet port 20 in a first direction, and bypasses through headspace 24 in the first vessel 10 to exit through an outlet 22 in the first vessel 10. The gas which has passed through the outlet 22 in the first vessel 10 enters a filter hose 26 inserted into the liquid 18 of the second vessel 12. The gas forced through the filter hose 26 exits through the bottom of the filter hose 26 and bubbles up toward an outlet 30 in the second vessel. The filtered gas then passes through gas mask hose 14 to be breathed by the user of the gas mask 16. When the user exhales gas within the gas mask 16, the exhaled gas passes through gas mask hose 14 once again and enters headspace 24 in the second vessel 12 such that port 30 acts as an inlet port when gas is travelling in the second direction through the port 30. After passing through headspace 24 of second vessel 12, the exhausted gas passes in a second or reverse direction through port 32 which is at this time an outlet port for the second vessel 12, and the gas is directed through a hole 28 inserted into the liquid 18 of the first vessel 10. As shown by the bubbles rising up through the liquid 18, the gas is being exhausted through port 20 which for this purpose is an outlet port in first vessel 10.

The gas mask filter thus removes harmful substances from the air so that the user of the gas mask 16 can breathe clean air. When the user fills his or her lungs, air enters the filter as shown by solid arrow A at the pipe connected to first vessel 10. The air then enters port 22 as shown by the solid arrow B and continues as shown by solid arrow C. The air is then bubbled through the liquid in second vessel 12 as shown by arrow D. The clean air then exits the vessel 12 via arrow E and on into the mask 16 through the gas mask tubing 14. The user of the gas mask can then be assured that clean air is flowing into his lungs.

When the gas mask user empties his or her lungs, the gas passes from the mask 16 as shown by broken arrow F where it enters second vessel 12. The gas exits vessel 12 via broken arrow G and passes through the upper portion of hose 28 as shown by broken arrow H. The gas is then bubbled through the liquid in vessel 10 as shown by broken arrow I. The gas then exits vessel 10 as shown by broken arrows J and K. It can be seen that the liquid in first vessel 10 performs no filtering function but is required to prevent unfiltered air from reaching the lungs of a gas mask user.

This gas mask can be used to remove smoke and poison gases from the air to be breathed by the gas mask user. The filtering liquid in vessel 12 also cools the air for additional safety during escape from a fire or the like. The liquid in vessel 12 may contain chemicals to assist in removing poisonous substances, if necessary. The filter vessels 10 and 12 must be kept in an upright position to prevent the loss of liquids therefrom. The gas mask filter as shown in FIG. 1 is such that gas to be filtered may move bi-directionally through the system in such a manner that the liquid barriers cannot be broken and that the liquids themselves act as seals against the outside, unfiltered air. Neither of the inlet or outlet ports for the first and second vessels contact the liquid, thereby rendering the filtering device siphon-proof.

The use of the liquid filter in a gas mask particularly exploits the use of the filtering liquids as valves. Only one vessel with liquid is actually used to filter the incoming atmosphere. Although the expelled gas from the gas mask is filtered through the liquid in the first vessel, the actual function of the liquid therein is that of a valve rather than a filter.

Figure 2:
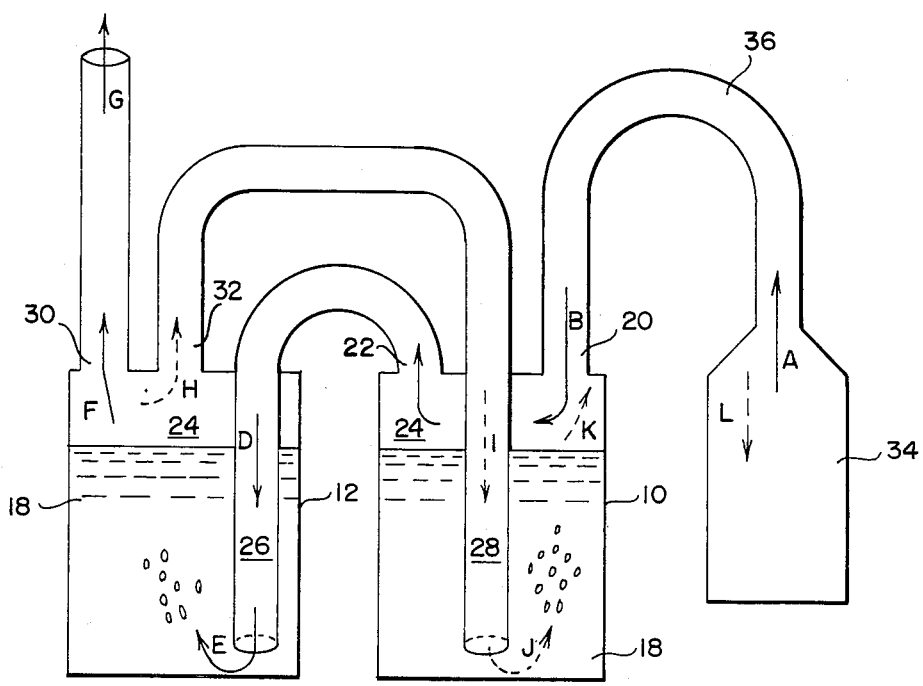
FIG. 2 is a cross-sectional view of an anti-siphoning liquid valve filter of the present invention for use in an exhaust gas scrubber.

FIG. 2 is a cross-sectional view of an anti-siphoning liquid valve filter for use with a gas scrubber according to the present invention.

The overall structure of the exhaust gas scrubber shown in FIG. 2 is similar to that of the gas mask filter described in connection with FIG. 1 in that a first vessel 10 is partially filled with liquid 18 as is second vessel 12. An exhaust gas container 34 expels contaminated gas therefrom through an exhaust gas container hose 36 and enters the first vessel 10 through an inlet 20 in a first direction. The gas passes through headspace 24 in the first vessel 10 and through an outlet 22 while still passing in a first direction through vessel 10. The gas by-passed through first vessel 10 then enters into filter hose 26 in the second vessel 12 and is filtered through liquid 18 of the second vessel 12 by being bubbled up through the liquid. The filtered gas then exists container 12 at an outlet port 30 travelling in the first direction.

When atmospheric air is intended to be provided into exhaust container 34, atmospheric air enters port 30 in second vessel 12 which at this time acts as an inlet port. Similar to that which occurs in the first vessel 10, the atmospheric air bypasses through second vessel 12 in the headspace 24 and passes through port 32 therein which at this time acts as an outlet port. Atmospheric gas is then directed through hose 28 provided within first vessel 10 so that the air bubbled thorugh the liquid of the first vessel is discharged through outlet port 20 in first vessel 10. The atmospheric air is then provided for use within gas container 34.

Also referring to FIG. 2, the exhaust gas scrubber operates by gas exiting reaction vessel 34 via the solid arrow A to a pipe 36 connected to vessel 34. The gas to be filtered enters vessel 10 as shown by solid arrow B. The gas exits vessel 10 via solid arrow C and continues through filter hose 26 as shown by solid arrow D. The gas is then bubbled through the liquid 18 in the second vessel 12 as shown by solid arrow E. The gas is then released into the atmosphere as shown by solid arrows F and G. In some chemical processes, it may be desired that the flow of gas should be reversed which creates no problems in the device of the present invention because the liquid barriers in vessels 10 and 12 are not broken. The gas from the atmosphere will flow from vessel 12 as shown by broken arrow H and into the hose 28 provided within vessel 10 as shown by arrow I. The gas then bubbles through the liquid 18 in vessel 10 as shown by the broken arrow J. The gas then flows back into the reaction vessel as shown by broken arrows K and L. It can be seen that no liquid flows with the gas as occurs in similar prior art devices having filter mechanisms. Use of the present filter provides an automatic safety feature for all gas scrubbing operations, in particular, chemical reactions that involve pressure to vacuum fluctuations. In addition, chemical reactions may be run at a faster rate, thus saving time.

Figure 3:
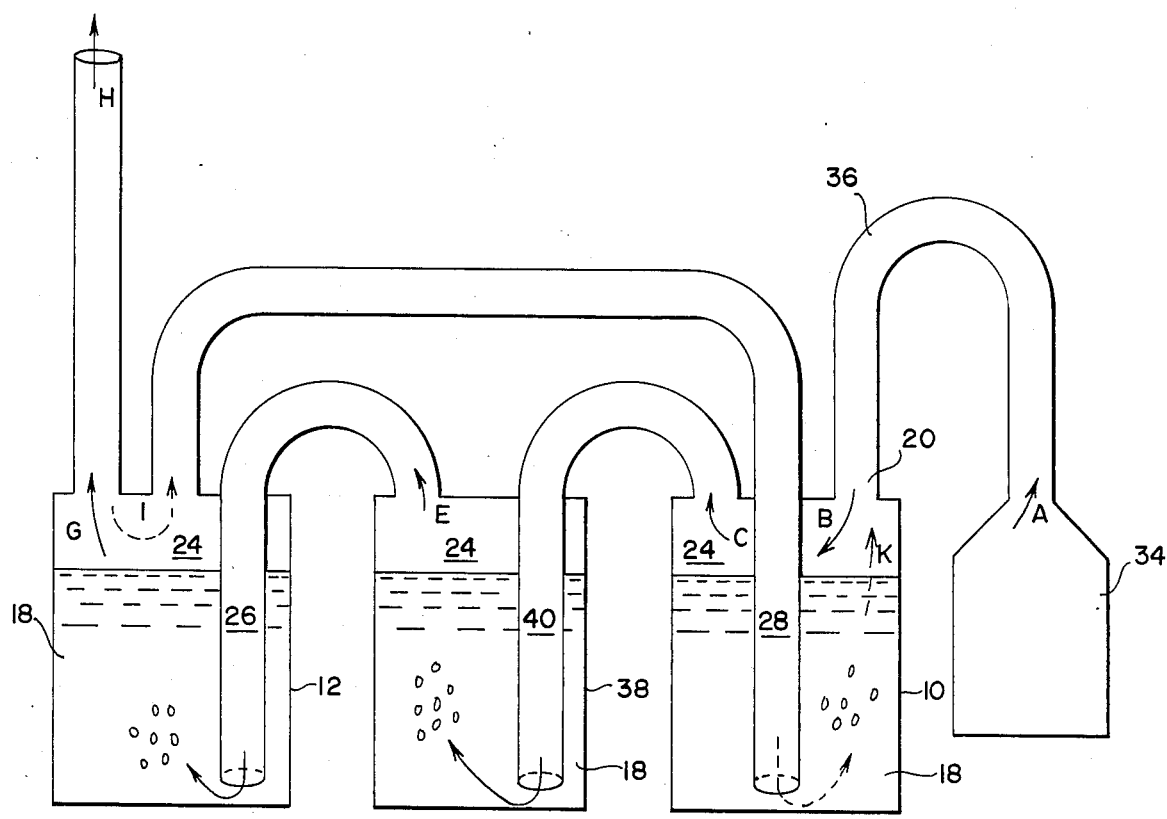
FIG. 3 is a cross-sectional view of an anti-siphoning liquid valve filter of FIG. 2, further including an intermediary filtering vessel.

FIG. 3 is a cross-sectional view of an anti-siphoning liquid valve filter for filtering gas which is utilized in a double exhaust gas scrubber of the present invention.

This variation of the exhaust gas scrubber of FIG. 2 is utilized when more than one scrubbing operation of an exhaust gas is required.

Referring now to FIG. 3, the double exhaust gas scrubber includes, in addition to first and second vessels 10 and 12, respectively, an intermediary vessel 38. The intermediary vessel 38 includes a filter hose 40 inserted into liquid 18, the liquid 18 partially filling container 38. Upon filtering, gas is bubbled up through the liquid 18 and exits an outlet port 42 provided within the surface of the container 38. Similar to vessels 10 and 12, vessel 38 includes headspace 24 therein, although this headspace is not utilized in a bypass manner such as that described in connection with FIGS. 1 and 2.

Accordingly, exhaust gas from a reaction vessel 34 exits the reaction vessel through the exhaust gas container hose 36 to vessel 10 as shown by solid arrows A and B. The gas flows to intermediary vessel 38 as shown by solid arrow C. The gas then passes through filter hose 40 of intermediary container 38 and is bubbled through the liquid 18 as shown by solid arrow D. The gas exits intermediary vessel 38 as shown by solid arrow E, passes through filter hose 26 in the second vessel 12, and is bubbled through the liquid 18 in the second vessel 12 as shown by solid arrow F. The gas passes up through the liquid 18 of vessel 12 and out of outlet port 30 to be released to the atmosphere as shown by solid arrows G and H.

If the reaction vessel 34 should present a vacuum instead of pressure during the chemical reaction, no liquid from first vessel 10 will be siphoned into the reaction vessel 34. Instead, gas exits second vessel 12 as shown by broken arrow I such that gas travels in a reverse or second direction. The gas may then be directed through filter hose 28 of first vessel 10 and filtered through a liquid 18 as shown by broken arrow J. The gas then exits first vessel 10 as shown by broken arrow K and continues on into the reaction vessel 34 via the gas container hose 36.

Similar to that described in connection with the single exhaust gas scrubber of FIG. 2, the liquid in first vessel 10 acts as a valve. The liquids in second vessel 12 and intermediary vessel 38 maintain the same levels as well because of the equalizing action of the passage of gas from vessel 12 to vessel 10. This feature provides for a simple and safe filtering action. Additionally, the chemical reaction in reaction vessel 34 can proceed at a higher rate of speed due to the simplicity of features of the present invention.

Accordingly, the anti-siphoning liquid valve filter of the present invention utilizes a double valve arrangement such that liquids in the two vessels act as valves. This double valve arrangement is unique and has the advantage that the two liquid valves or barriers cannot be broken by applying either vacuum or pressure at either of the two ports as previously described. Since the liquid valves or barriers cannot be broken, this permits rapid and safe scrubbing or cleaning of a gas passing through the liquid filter, thus realizing improvements and advantages over existing gas scrubbers and cleaning filters. There are no mechanical valves provided within the filter of the present invention, nor are any required.

The present invention may be provided with aeration devices at the bottom of filter hoses 26, 40 and 28, which would serve to break up bubbles of the gas and insure a complete scrubbing or filter operation. The aeration devices may include a large number of holes drilled in caps which are placed at the ends of the respective pipes.

The filter vessels such as 10, 12, and 38 may be constructed of any suitable material, such as glass, plastic, metal, rubber, or any combination of materials. Two or more vessels can share a common wall and can be cylindrical or rectangular in shape. The interior conduits, pipes, or filter hoses can be either channels or ducts on the common wall, or can separate walls of the vessels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for the filtering of a gas for a gas mask through a liquid comprising the steps of:
    (a) inhaling atmospheric gas at the gas mask by a user;
    (b) bypassing the gas over a liquid partially filling a first vessel upon inhaling;
    (c) filtering inhaled bypassed gas through liquid partially filling a second vessel, whereby the filtered gas enters the gas mask for inhalation by the user;
    (d) exhaling gas at the gas mask by the user;
    (e) bypassing the gas over the liquid partially filling the second vessel upon exhaling; and
    (f) directing exhaled bypassed gas through the liquid partially filling the first vessel, whereby the gas exits the first vessel to the atmosphere.

2. A method for filtering an exhaust gas from a reaction container comprising the steps of:
    (a) exhausting contaminated gas from the reaction container;
    (b) bypassing the gas over a liquid partially filling a first filtering vessel;
    (c) filtering the gas bypassed through the first vessel through liquid partially filling a second filtering vessel, whereby a reversal of gas filtered through said second vessel into said first vessel will not occur;
    (d) exhausting filtered gas from the second vessel;
    (e) filtering the filtered gas exhausted from the second vessel through liquid partially filling a third vessel, whereby a reversal of gas filtered through said third vessel into said second vessel will not occur; and
    (f) exhausting filtered gas from the third vessel into the atmosphere.

3. An anti-siphoning liquid valve filter for filtering a gas, said filter comprising:
    a first vessel partially filled with liquid, said first vessel including,
        bypass means for enabling non-filtered gas to pass through said first vessel without impregnating the liquid and for preventing siphoning of the liquid from said first vessel,
        means for filtering non-filtered gas through the liquid in said first vessel, and
        means for discharging filtered gas from said first vessel; and
    a second vessel partially filled with liquid, said second vessel including,
        bypass means for enabling non-filtered gas to pass through said second vessel without impregnating the liquid and for preventing siphoning of the liquid from said first vessel, means for filtering non-filtered gas through the liquid in said second vessel, and means for discharging filtered gas from said second vessel;

wherein gas may be filtered in both a first direction through said first and second vessels, respectively, and a second direction through said second and first vessels, respectively, and wherein said bypass means prevents the siphoning of liquid from either of said first and second vessels in either of said first and second filtering directions.

4. The anti-siphoning liquid valve filter according to claim 3, further including an intermediary vessel partially filled with liquid and having additional means for filtering the gas by directing the gas into the liquid of the intermediary vessel.

5. The anti-siphoning liquid valve filter according to claim 3, wherein said bypass means in said first vessel includes identical ports formed in the surface of the vessel that do not contact the liquid for allowing the gas to pass over the liquid surface in said first vessel and prevent siphoning of the liquid from said first vessel in a first filtering direction, thereby directing the gas to said means for filtering in said second vessel.

6. The anti-siphoning liquid valve filter according to claim 3, wherein said bypass means in said second vessel includes identical ports formed in the surface of the vessel that do not contact the liquid for allowing the gas to pass over the liquid surface in said second vessel and prevent siphoning of the liquid from said second vessel in a second filtering direction thereby directing the gas into said means for filtering in said first vessel.

7. The anti-siphoning liquid valve filter according to claim 3, wherein said means for filtering includes a filter hose originating at said first vessel and being inserted into the liquid of said second vessel, and a filter hose originating at said second vessel and being inserted into the liquid of said first vessel.

8. The anti-siphoning liquid valve filter according to claim 3, wherein said liquid is chemically modified to remove poisonous substances from the gas in the first filtering direction.

9. The anti-siphoning liquid valve filter according to claim 3, wherein said filter is for use with a gas mask.

10. The anti-siphoning liquid valve filter according to claim 3, wherein said filter is for use with an exhaust gas scrubber.

11. The anti-siphoning liquid valve filter according to claim 4 wherein said filter is for use with a double exhaust gas scrubber.

* * * * *